(12) United States Patent
Fritsch

(10) Patent No.: US 9,077,513 B2
(45) Date of Patent: Jul. 7, 2015

(54) HIGH PRECISION SYNCHRONIZED MEASURED VALUE ACQUISITION

(75) Inventor: Robert Fritsch, Balgach (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 0 days.

(21) Appl. No.: 14/125,290

(22) PCT Filed: Jun. 6, 2012

(86) PCT No.: PCT/EP2012/060688
§ 371 (c)(1),
(2), (4) Date: Dec. 10, 2013

(87) PCT Pub. No.: WO2012/168294
PCT Pub. Date: Dec. 13, 2012

(65) Prior Publication Data
US 2014/0126677 A1 May 8, 2014

(30) Foreign Application Priority Data
Jun. 10, 2011 (EP) ..................................... 11169504

(51) Int. Cl.
*H04L 7/04* (2006.01)
*G01D 5/244* (2006.01)
*G01D 21/02* (2006.01)

(52) U.S. Cl.
CPC ................ *H04L 7/04* (2013.01); *G01D 5/2448* (2013.01); *G01D 21/02* (2013.01)

(58) Field of Classification Search
CPC ... H04L 7/0008; H04L 7/0012; H04L 7/0037; H04L 12/422; H04L 12/433; H04L 7/00; H04L 7/0025; H04L 7/10; H04L 7/04
USPC .................................. 375/354, 356, 372, 373
See application file for complete search history.

(56) References Cited

U.S. PATENT DOCUMENTS 4,523,274 A * 6/1985 Fukunaga et al. ............. 710/107
5,594,763 A * 1/1997 Nimishakavi ................. 375/376
(Continued)

FOREIGN PATENT DOCUMENTS

| DE | 3 912 162 A1 | 10/1990 |
| DE | 196 13 734 C1 | 8/1997 |

(Continued)

OTHER PUBLICATIONS

European Search Report dated Dec. 22, 2011 as received in Application No. EP 11 16 9504.

*Primary Examiner* — Emmanuel Bayard
(74) *Attorney, Agent, or Firm* — Maschoff Brennan

(57) ABSTRACT

The invention relates to a method for wire bound, high precision, temporal synchronization of measured value acquisition in a measurement system designed as a space coordinate measurement apparatus having a plurality of measurement sub-units with signaling of a time for triggering the measured value acquisition by means of a trigger signal and with the respective acquisition and intermediate storage of a measured value in the measurement sub-unit at the time determined by the trigger signal. Each acquisition of the measured value is carried out in the measurement sub-units in a time quantified manner with a local timing signal of the measurement sub-unit. A phase synchronization of the local timing signals of the measurement sub-units is then carried out using a synchronization signal in order to ensure simultaneity of the acquisition of the measured value in the measurement sub-units with a temporal uncertainty which does not exceed a phase jitter of the synchronization, and which is in any case less than 90% of a period duration of the local timing signal.

18 Claims, 10 Drawing Sheets

(56) References Cited

U.S. PATENT DOCUMENTS

| | | | |
|---|---|---|---|
| 5,657,549 A | 8/1997 | Shen et al. | |
| 6,272,137 B1* | 8/2001 | Noiri | 370/395.1 |
| 6,633,590 B1* | 10/2003 | Garofalo et al. | 370/507 |
| 7,478,256 B2* | 1/2009 | Conway et al. | 713/401 |
| 7,747,888 B2* | 6/2010 | Frodsham et al. | 713/400 |
| 8,230,118 B2* | 7/2012 | Toba et al. | 710/5 |
| 2005/0166413 A1 | 8/2005 | Crampton | |
| 2009/0077193 A1* | 3/2009 | Parris et al. | 709/209 |
| 2011/0191512 A1* | 8/2011 | Beccue | 710/110 |
| 2011/0246809 A1* | 10/2011 | Dewhirst et al. | 713/401 |
| 2011/0276820 A1* | 11/2011 | Patel et al. | 713/400 |

FOREIGN PATENT DOCUMENTS

| | | |
|---|---|---|
| EP | 237 680 A2 | 9/1987 |
| EP | 0 652 413 A2 | 5/1995 |
| EP | 1 805 953 B1 | 7/2010 |
| FR | 2 908 507 A1 | 5/2008 |

* cited by examiner

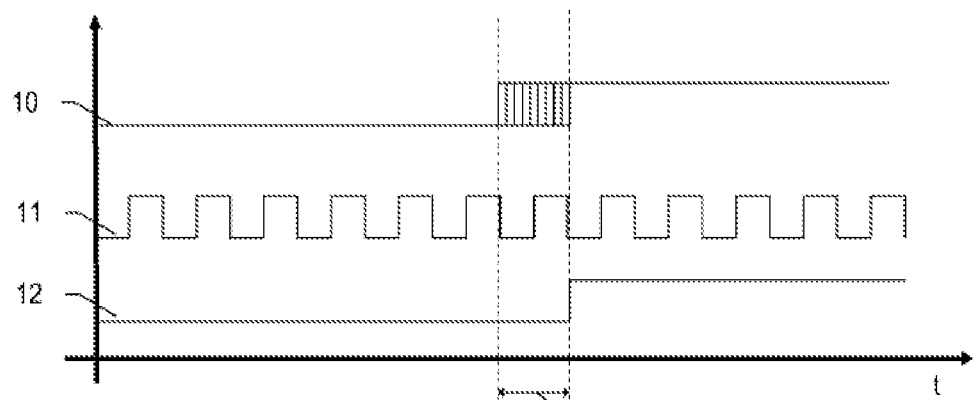
Fig. 1a - Prior Art
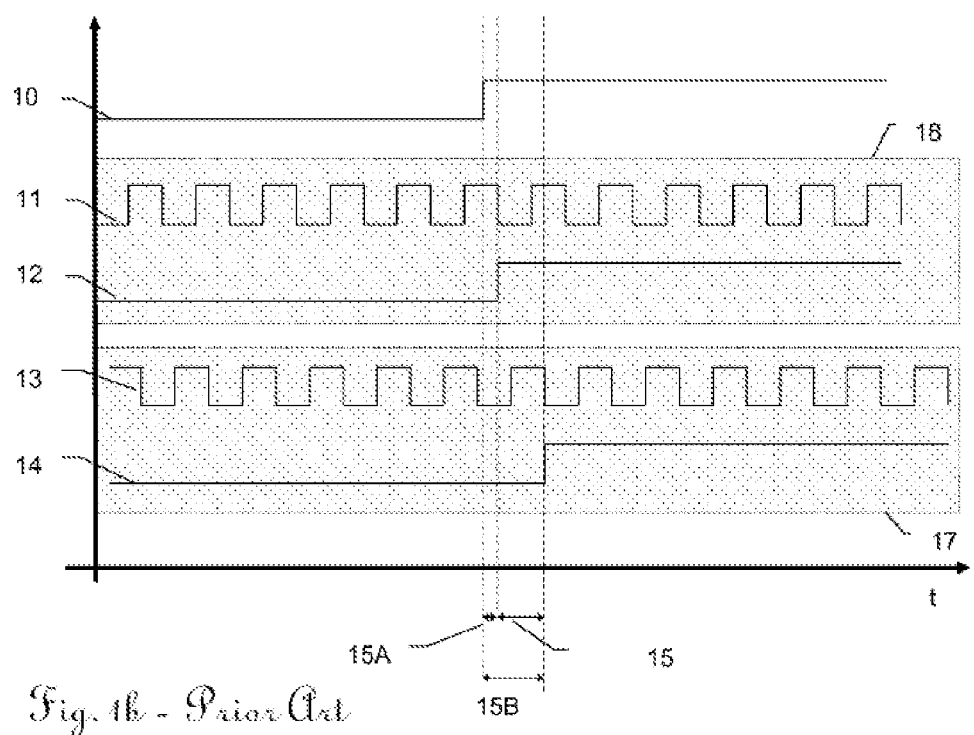
Fig. 1b - Prior Art

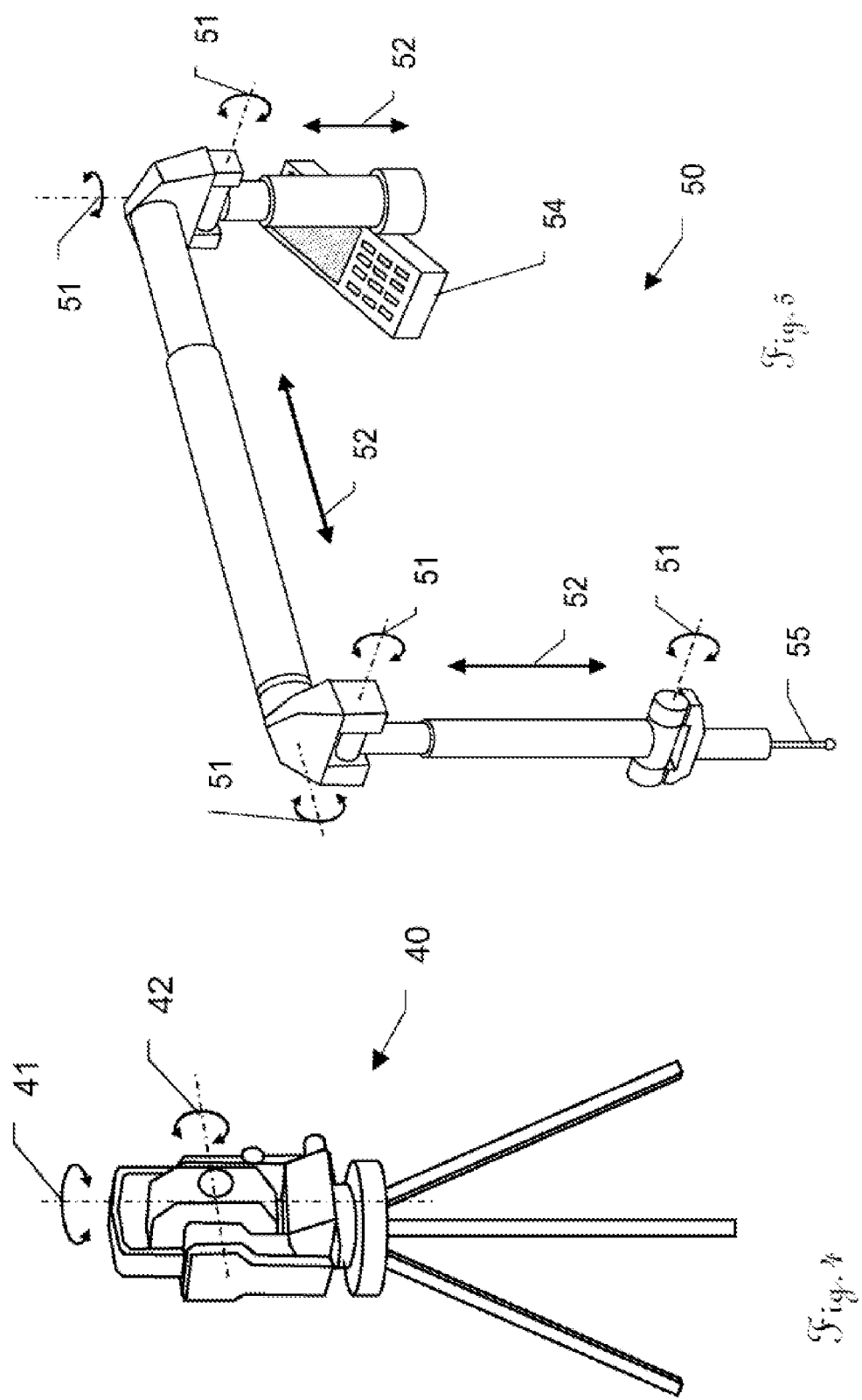

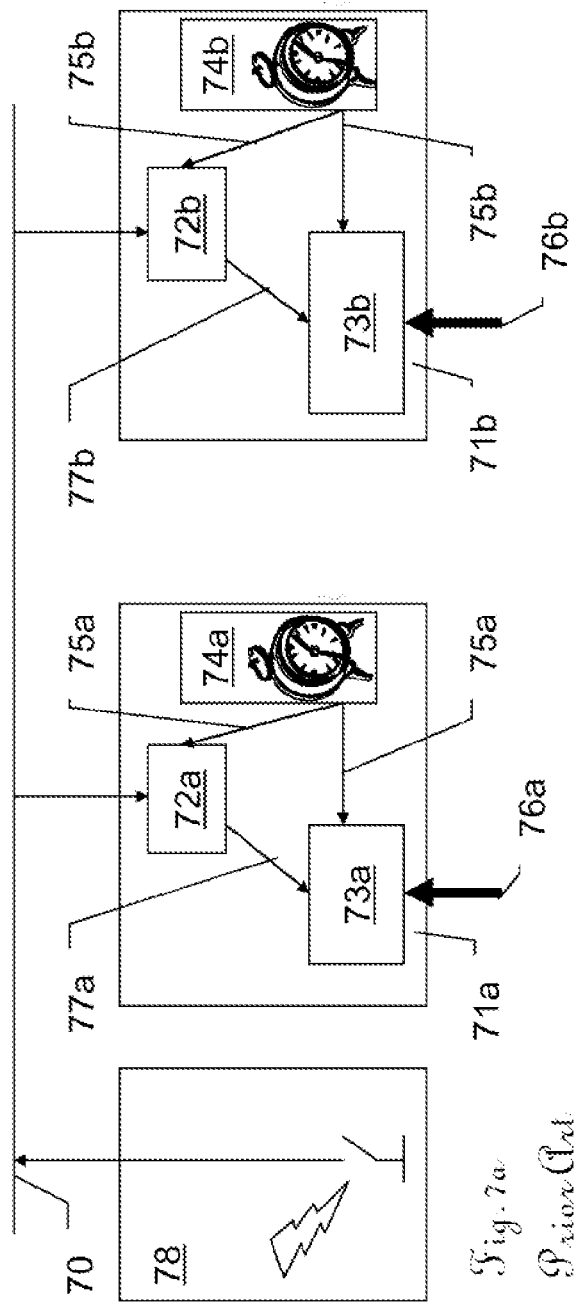
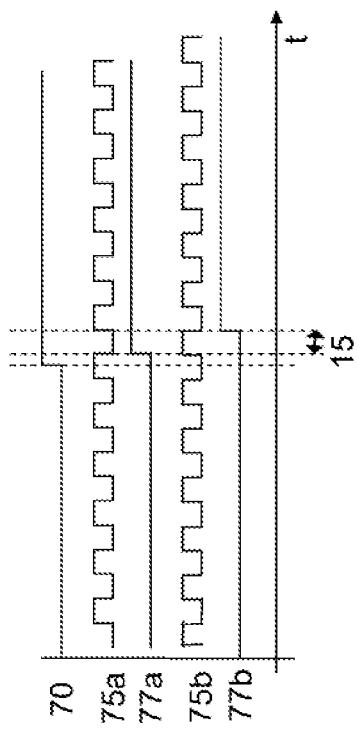
Fig. 7a Prior Art
Fig. 7b

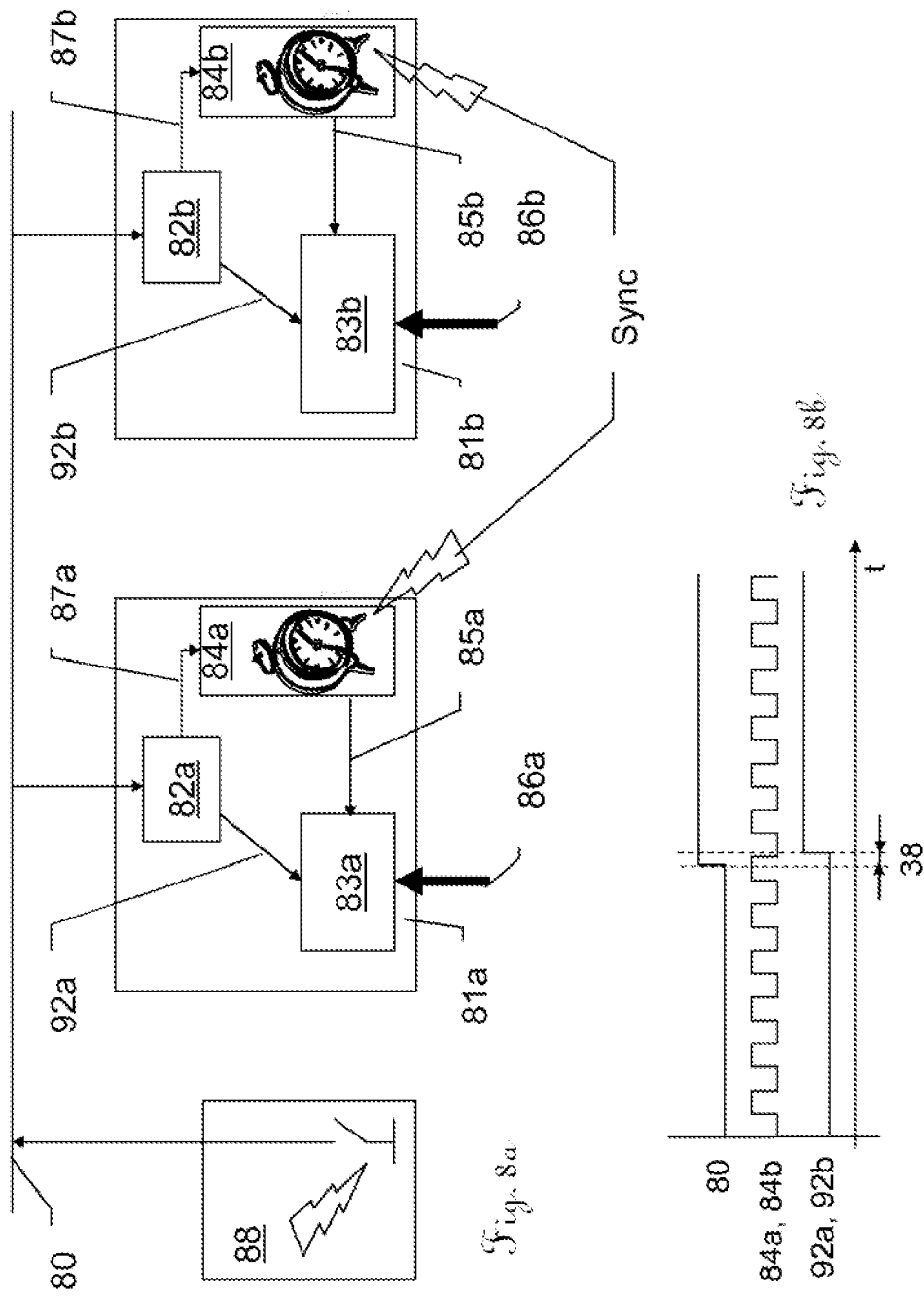

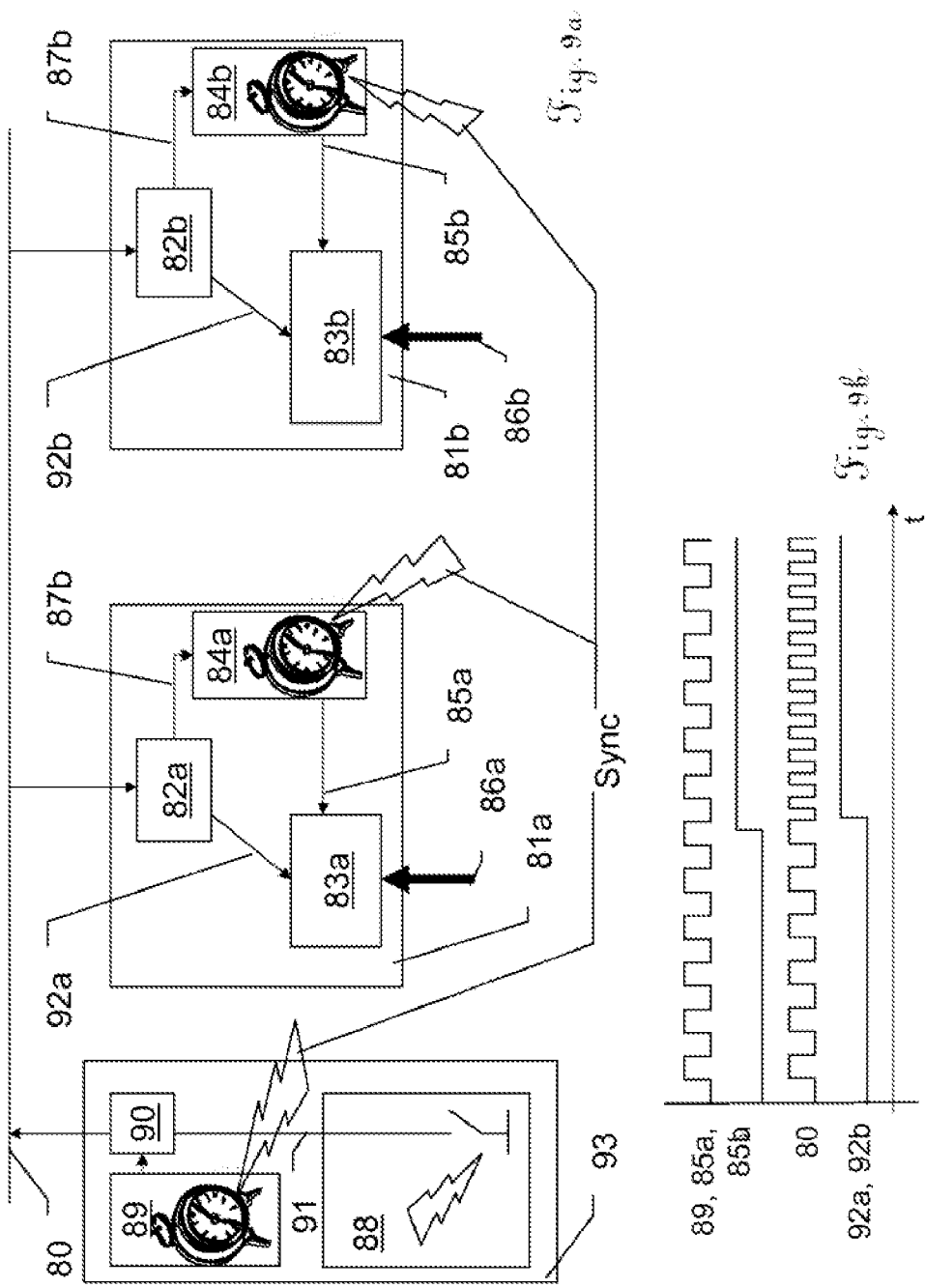

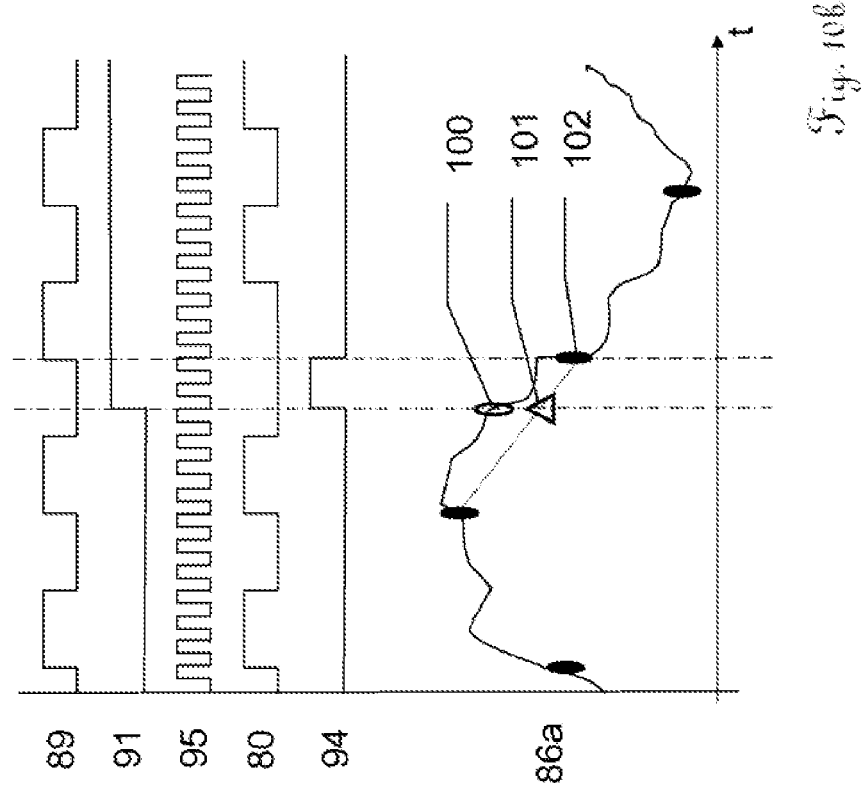
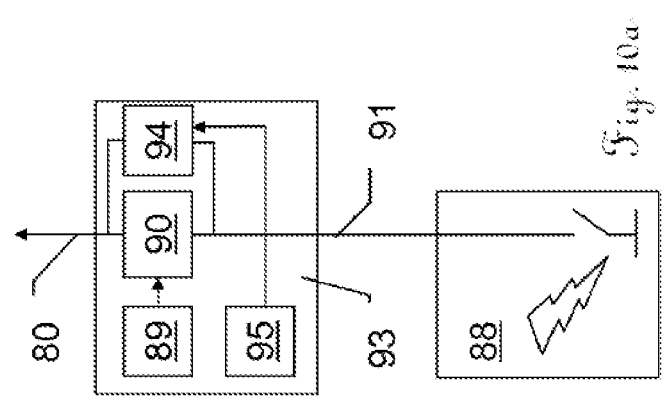

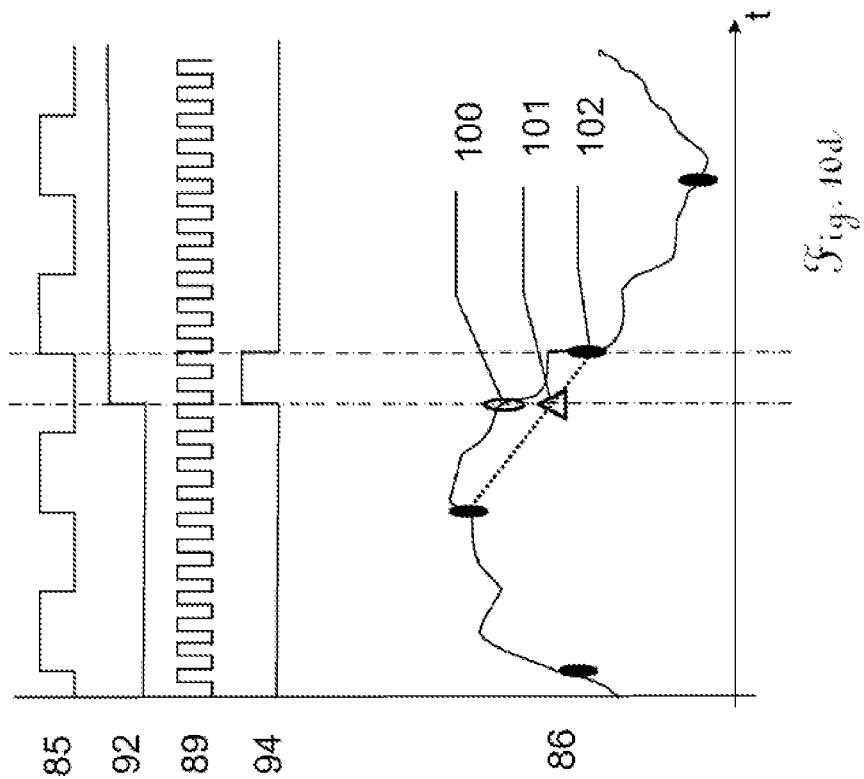
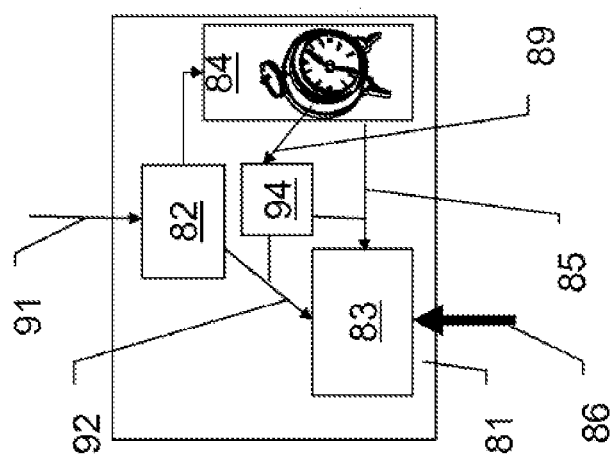

HIGH PRECISION SYNCHRONIZED MEASURED VALUE ACQUISITION

FIELD OF THE INVENTION

The invention relates to a method for the temporal synchronization of measured value acquisitions in a measuring system comprising a plurality of measuring subunits, and to a triggerable measuring system comprising a plurality of measuring subunits.

BACKGROUND

Measuring systems comprising distributed subsystems in which measured values should be acquired as far as possible time-synchronously have been known and commercially widespread for a relatively long time. They include specifically coordinate measuring systems such as, for example, geodetic instruments, articulated arms or coordinate measuring machines. These usually have a plurality of movement axes each equipped with a measuring subsystem for acquiring a position of the axis. In this case, the position can be present in the form of a length position, angular position, or a combined spatial position as measured value. The measured values of the individual subsystems can be determined by means of position value sensors of a wide variety of embodiments, for example by means of image processing, absolute- or relative-encoded displacement or angle sensors, analog probe heads for determining deflection, or other suitable methods. Furthermore, auxiliary variables such as, for example, velocity, acceleration, temperature, air pressure, air humidity, force, distance or contact, etc. can also be measured and acquired, as well as any arbitrary combination of these measured values.

In this case, it is important in high precision measurements to know all the measured values of the measuring subsystems at one and the same, precisely determined instant, in order to obtain a consistent set of data. Different instants of the measurement in the different subsystems can lead to inconsistent data in the event of a possible change in the values to be measured between said instants, for example as a result of movement of the axes. If such inconsistent data are processed further, for example in order to determine spatial coordinates therefrom, this leads to an erroneous or imprecise overall measurement, for example if the exact spatial coordinates of a moving object are intended to be determined at a specific instant.

In order to prevent such errors, it is therefore important, during a measurement, to acquire all measured values in the subsystems as far as possible exactly at the same instant or to know at least the respective measurement instants precisely. The first option is usually realized in such measuring systems by means of a global trigger signal which determines the instant of the measured value acquisition in the measuring subsystems. The second option requires correspondingly precise knowledge of possible delays between the respective measurement instants, wherein the delays in this case must preferably be deterministic, that is to say fixed or determinable for the respective measurement.

This can take place in a wide variety of ways. Often, as known from U.S. Pat. No. 5,657,549, for example, at the instant of a level change in the trigger signal, in all subsystems the current measured value is acquired and buffer-stored. The buffer-stored measured values can then be read out, also temporally asynchronously with respect to one another, by a control unit, for example using bus systems, radio signals or the like.

In the control unit, an overall measured value can then be determined on the basis of the partial measured values. In the measuring system known from U.S. Pat. No. 2005/01 66 413 A1, by way of example, the spatial position of a tactile probe head which triggers a trigger signal at the instant of contact with a workpiece can be determined from the measured position values of the subsystems.

In this case, the trigger signal can be triggered at predefined time intervals or by external influences, wherein the trigger signal can indeed also be regarded as a specific form of a measurement signal which serves to determine the instant of the measured value acquisition in the measuring system. Such external influences for triggering may constitute e.g. the switching of tactile measuring probes, the movement through light barriers, the attainment of switching thresholds of a measured value in a subsystem, manual triggering of the measurement by the pressing of a button, automatic triggering of the measurement by a superordinate control unit, temporal clock generators, etc. These triggering events can take place independently and thus also asynchronously with respect to the clock generators of the measuring system or the subsystems thereof.

A large number of the measuring systems available nowadays have subsystems which acquire the partial measured values locally by means of digital electronics, for example a microprocessor or the like. In this case, the clock signals for data processing have a frequency of at least several hundred kilohertz; the clock signals usually have frequencies in the range of 1 megahertz to 4 gigahertz, often in the two- or three-digit MHz range. The arrangement of these subsystems directly at the location of the respective measurement gives rise to a spatially distributed measuring system. In order to minimize the resultant outlay on cabling, therefore, data transmission using as few lines as possible is striven for in many cases.

Particularly because these connections in the measuring system often have to be routed via complex and fault-susceptible sliding contacts, trailing cables and plug connections and often also over considerable line lengths.

DE 3 912 162 describes a bus system in which both the supply voltage and the communication data of a subsystem are transmitted via one and the same line. The outlay on cabling in the measuring system can thereby be reduced.

EP 237 680 describes a method in which a global trigger signal is synchronized in each case with the local system clock of the subsystem. However, each of the distributed measuring subsystems on the bus operates with a different local clock signal for sampling the trigger signal, as a result of which the local clock signals can deviate in terms of phase angle and frequency relative to one another.

As a result, in each measuring subsystem, although a synchronized, local trigger signal arises, said signal may indeed be temporally offset relative to the received trigger signal and those of the other subsystems and thus leads to a different instant of measurement in the individual measuring subsystems. The temporal uncertainty can be as much as a local clock cycle in this case.

In digital signal processing systems, the "synchronizing in" of external, asynchronous signals is a conventional procedure for avoiding malfunctions on account of unstable switching states or excessively short signal pulses, so-called "glitches". Such input circuits for reading in external signals are often realized by so-called "double registered signals" and are part of the fundamentals in the design of digital circuits, for example of FPGA or ASIC designs. This prevents internal signal state changes during a clock period which, for example on account of chip-internal propagation times or tolerances in the switching behavior of the internal logic elements, may lead to undesired effects, a non-deterministic behavior, or even forbidden switching states. In order to avoid these, the signal delays associated therewith in terms of circuitry are also accepted, especially since their duration is known at least in clock cycle units, which enables possibilities of possible compensation of possible negative effects resulting therefrom. However, even then an uncertainty in the range of a clock cycle time always remains, since the exact instant of the signal change between two clock periods remains unknown.

By way of example, the respective subsystems or measuring module can also allocate an internal time stamp for measurement, store it and communicate it together with the measured value. As a result, delays, caused e.g. by glitches, can be identified and, if appropriate, compensated for. In the case of synchronized clocks for the time stamps in all the measuring modules, a delay can be identified on the basis of a slightly deviating time stamp and—for example by means of a majority decision—it is possible to determine the most probable time stamp for the measuring requirement.

For explanation purposes, by way of example, two unsynchronized local clock signals, a first and a second local clock signal, are present in one or in a plurality of digital systems (casu quo as measuring subsystems), for instance in the form of two clock signals generated by independent, free-running quartz clock generators. An external signal (casu quo as trigger signal) is respectively synchronized in with the corresponding first and second local clock signals. The two resulting synchronized-in representations of the external signal can—even in the case of an identical value of the local clock frequency—now deviate temporally from one another by up to one clock period. The two resulting internal trigger signals synchronized for further processing can thus have a temporal uncertainty of up to one clock period relative to one another, even though this was generated from the same external signal and, if appropriate, also with a clock signal having the same period duration. Consequently, in the first and second measuring subsystems, the triggering instant of the measurement can deviate despite unambiguous triggering with the same trigger signal. In some cases, particularly at clock rates chosen to be correspondingly high, the resultant error may appear to be negligibly small; nevertheless, said error can become apparent in an adverse way in the case of stringent requirements in respect of precision and can constitute a non-deterministic error source. High clock rates in digital systems are additionally associated with the disadvantage of a higher power loss and usually also a more complex circuit design.

SUMMARY

The object of the present invention is therefore to improve a measuring system, in particular a measuring system comprising a plurality of measured value pick-ups as measuring subsystems.

One specific object is to reduce the temporal uncertainty of the subsystems in order either to carry out measurement as far as possible simultaneously at all points or to know at least the respective measurement instants as precisely as possible.

A further object here is to achieve this synchronization of the measured value acquisition with the outlay on cabling remaining the same or even being reduced.

Another object is to achieve a reduction in the complexity of the subsystems, wherein inter alia as few components as possible are intended to be used in order to keep the structural size small and costs low.

These objects are achieved by the realization of the characterizing features of the independent claims. Features which develop the invention in an alternative or advantageous manner can be gathered from the dependent patent claims.

The stated objects as presented above are achieved according to the invention by virtue of the fact that, besides the trigger signal, a synchronization signal is additionally also transmitted, at which the respective local clock signals of the respective subsystems are phase-synchronized.

It is thus possible to achieve a phase synchronization of the measuring subsystems among one another with a temporal error which is significantly less than one clock cycle. If the trigger signal with these synchronized clock signals is then evaluated, the temporal offset of the instant of acquiring the measured value between the subsystems is significantly less than one clock cycle in a system-governed manner. The offset is now of the order of magnitude of the synchronization accuracy of the clock signals, which achieves accuracies of significantly less than a period duration of the clock signal, usually more accurate by several powers of ten. Consequently, the respective measurements have in relation to one another a temporal uncertainty which does not exceed a phase jitter of the phase synchronization of the clock signals.

According to the invention, this is realized by means of the method described here for the line-based high precision temporal synchronization of measured value acquisitions in a measuring system designed as a spatial coordinate measuring machine and comprising a plurality of, in particular spatially distributed, measuring subunits. In this case, the method involves carrying out signaling an instant for triggering the measured value acquisition by means of a trigger signal, and respectively acquiring and buffer-storing a measured value in the measuring subunit at the instant determined by the trigger signal, wherein the measured value is acquired in the measuring subunits in each case in a time-quantified manner with a local clock signal of the measuring subunit.

In this case, the invention involves carrying out phase synchronization of the local clock signals of the measuring subunits by means of a synchronization signal for ensuring simultaneity of acquiring the measured value in the measuring subunits with a temporal uncertainty which does not exceed a phase jitter of the synchronization. The temporal uncertainty is thus in any case less than 90% of a period duration of the local clock signal, in particular less than half a period duration, preferably less than one fifth of the period duration, or even less still.

In this case, the instant of the physical measured value acquisition, that is to say the triggering instant of the actual acquisition, is synchronized across the measuring subsystems, as are the local clocks in the measuring subunits with which these acquisitions are performed. A subsequent numerical determination of a fictitious measured value at an instant at which no physical acquisition of a measured value at all took place is not meant. Even in the embodiment which is described toward the end of the text and in which a subsampling temporal resolution of the local clock signals is obtained by means of an even faster subsampling clock dedicated to this task, the local clock signals for the acquisition and evaluation of the measured values in the measuring subunits are synchronized according to the invention.

In this case, a physical variables such as position, velocity, acceleration, contact, temperature, air pressure, air humidity, force, pressure, voltage or current, or an arbitrary combination thereof, can be acquired by the measuring subunit.

In the simplest case, a synchronization signal could be transmitted here via a signal line provided especially therefor.

In order not to have to provide an additional signal line for the synchronization of the local clock signals, according to the invention the synchronization signal is concomitantly transmitted via a line already present. In particular, by way of example, the voltage supply, the trigger signal line or some other signal or clock or data line already present, in particular lines of a digital communication channel between the subunits or between the subunits and a superordinate control unit, is appropriate for this purpose.

In this case, line or signal line should not necessarily be understood to mean an individual physical wire, rather this can for example indeed also involve a differential line pair, an optical waveguide or the like. The signal transmission is in any case line-based and does not involve free-space transmission by means of a radio signal.

In order to realize the simultaneous transmission of the synchronization signal together with other signals, a wide variety of methods, known for example from communications technology, can be employed. In particular, modulation methods in a wide variety of embodiments, and line coding methods are of importance here for data transmission purposes.

By way of example, it is possible to use a modulation method such as ASK, PSK, FSK, QAM modulation or other modulation methods which are suitable for this purpose and which are familiar to a person skilled in the art in this field or are sufficiently documented in the relevant technical literature and can be looked up there.

Line coding methods such as, in particular, a Manchester code or others can also be used for the combined transmission of data and synchronization information via one and the same line.

Furthermore, by way of example, the use of edges of a start, stop, data or address bit of a communication line can also be utilized, provided that they are based on a signal suitable as clock reference, or are synchronized with such a signal. In the case of a modulated signal transmission, by way of example, it is also possible to use a carrier frequency or a concomitantly transmitted pilot signal for synchronization purposes.

In addition, numerous specific clock recovery methods are also known from the field of communications technology and are likewise suitable for the synchronization signal transmission according to the invention. Unlike in communications technology, however, in this case the extracted clock information is not primarily used for synchronously demodulating therewith the data signal likewise transmitted, rather the respective clock of the local evaluation units is synchronized therewith, as a result of which the trigger signal in each subsystem is thus evaluated synchronously, as a result of which a high simultaneity of the measured value acquisition can be obtained according to the invention. In this case, a synchronous demodulation is optionally also furthermore possible.

The joint transmission of synchronization signal and trigger signal can furthermore also be devised in the form of a logical combination of the signals. Such a combination constitutes a specific, simple realization of a digital modulation or coding method.

For generating the local synchronized clock signal it is possible to use for example a PLL (phase locked loop), a modified Costas loop, or other known circuits suitable therefor.

The possibility of transmitting a synchronization signal with a multiple of the cycle time of the clock signal is also appropriate. From this it is possible, for example with the aid of a PLL, in turn to generate a clock signal having the original frequency in a synchronous manner, if the PLL has a correspondingly stable static phase offset, tracking jitter and low phase noise. In contrast to the likewise possible direct transmission of the synchronization signal as a global clock signal, this affords the advantage, for example, of a significantly lower transmission frequency, which entails advantages with regard to the immunity to interference, the interference emission and the resulting reduced quality requirements made of the cables or lines being used.

In one possible alternative embodiment of the invention, a local clock generator in the subsystems could even be dispensed with. In this case, the local clock signal is directly transmitted directly with the aid of one of the methods described above, or generated from the synchronization signal by means of a PLL, as a result of which costs and structural size of the subsystem can be reduced.

If the local clock signal is subjected to a freely selectable phase offset in relation to the synchronization signal, it is additionally possible to achieve a compensation of the unavoidable signal propagation time on account of the line lengths and on account of circuitry delays in the components, which enables a further improvement in the synchronization accuracy of the measuring system. Advantageously, the signal propagation time and delay are in this case determined automatically by the measuring system and then the resultant phase offset is set in the subsystems. The determination of propagation times and/or of the necessary correction values can also take place manually, for example in the context of a set-up or calibration process. A theoretical determination of delays on the basis of line lengths, component delays from data sheets, etc. is also possible. It is also possible to take account of known or measured edge steepnesses of the transmitted signals, together with the switching thresholds of the logic elements.

BRIEF DESCRIPTION OF THE DRAWINGS

The device according to the invention and the method according to the invention are described in greater detail purely by way of example below on the basis of concrete exemplary embodiments illustrated schematically in the drawings, further advantages of the invention also being discussed. In the figures in detail:

FIG. 1a shows the temporal offset—present in the prior art—of the instant of the measured value acquisition in the case of clock-based measured value acquisition;

FIG. 1b shows an example of the temporal offset—present in the prior art—of the instant of the measured value acquisition in two triggered measuring subsystems in the case of unsynchronized local clock signals;

FIG. 4 shows by way of example a geodetic instrument comprising two subsystems according to the invention for angle determination;

FIG. 5 shows by way of example an articulated arm comprising position and angle measuring systems according to the invention;

FIG. 7 shows by way of example a schematic illustration of a measuring system known from the prior art with a trigger signal;

FIG. 8 shows by way of example a schematic illustration of an embodiment of a measuring system with clock signals synchronized according to the invention, wherein the trigger signal is provided to the subsystems asynchronously and is time-quantized in the respective subsystems;

FIG. 9 shows by way of example a schematic illustration of an embodiment of a measuring system with clock signals synchronized according to the invention, wherein the trigger signal is time-quantized in one of the subsystems and is subsequently provided to the further subsystems in an already synchronized fashion;

FIG. 10a shows by way of example a schematic illustration of an embodiment of a measuring system with a clock and trigger signal synchronized according to the invention according to FIG. 9 with a subsampling interpolation;

FIG. 10b shows by way of example a time profile of the signals associated with FIG. 10a;

FIG. 10c shows by way of example a schematic illustration of an embodiment of a measuring system with a clock signal synchronized according to the invention and an asynchronous trigger signal in accordance with FIG. 8 with a subsampling interpolation;

FIG. 10d shows by way of example a time profile of the signals associated with FIG. 10c.

FIG. 1a shows the temporal uncertainty which during the digital signal processing of an external signal 10 on account of the time quantization as a result of the required synchronization of the external signal 10 with a local clock signal 11. Since the external signal can occur asynchronously with respect to the local processing clock 11 in the measuring subunit, it is necessary, in order to guarantee a deterministic digital processing, to effect synchronization with the local clock 11. The resulting internal signal 12 synchronized in, which is processed further internally in the circuit, can in this case experience a temporal offset 16 in relation to the external signal 10 of up to a period duration of the local clock signal 11. In the case of the high precision measuring systems dealt with here, such an offset 16, especially with respect to a trigger signal 10 that determines the instant of the measured value acquisition, can lead to measurement deviations and effects that are undesired and also non-deterministic as a result of the indefinite phase angle of the clock signal 11, particularly if the bandwidth of the measurement signal to be acquired significantly exceeds the local clock frequency 11.

DETAILED DESCRIPTION

Figure 2:
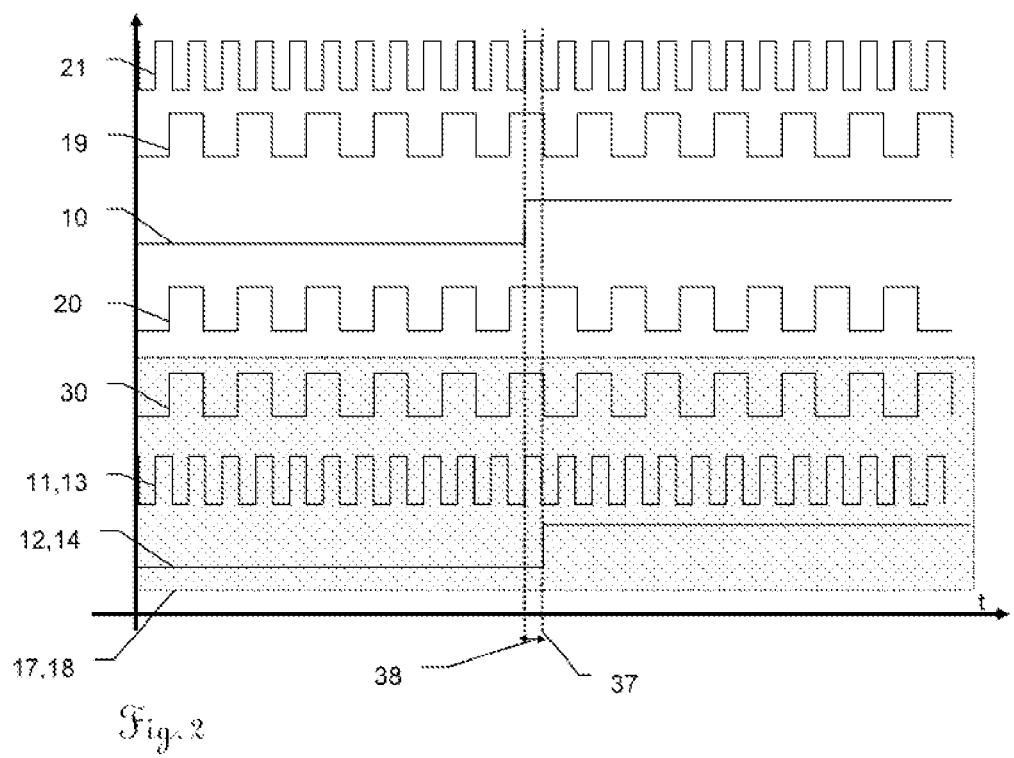
FIG. 2 shows by way of example on the basis of timing diagrams of a synchronization according to the invention of the local clock signals in a plurality of measuring subsystems on the basis of an embodiment with a combined clock-trigger signal and a synchronous recovery of the clock and trigger signal in the subsystems.

One partial aspect of the synchronization according to the invention is also the fact that in the subsystems it is possible to employ slower local clock signals, as a result of which these have a reduced energy consumption, but a simultaneity of the measurements that remains the same or is even improved can nevertheless be obtained in a synchronization-governed manner.

Especially if the trigger signal 10 is used to exactly define the instant of the measured value acquisition in a plurality of measuring subsystems 17, 18, this can lead, on account of the local clock frequencies 11, 13 deviating in terms of phase angle and/or frequency in the respective measuring subunits 17, 18, to disturbing deviations 15 of the actual instant of the measured value acquisition between the measuring subsystems 17, (and also to different deviations 15A, 15B in relation to the actual trigger instant 10). Since these deviations are non-deterministic on account of the free-running local clock signals 11, 13, these are also beyond a numerical correction and can at most only be taken into account statistically. (In the figures, respectively identical signals are represented only once, but provided with a plurality of reference signs.) The principle according to the invention here can be extended to an arbitrary number of subsystems 17, 18.

FIG. 1b illustrates such a temporal offset 15 which is present in the prior art and which the local trigger signals 12 and 14 can have relative to one another and also in relation to the triggering trigger signal 10. This jitter 15, 15A, 15B of the local measurement instant is caused by the free-running local clock signals 11 and 13 used for sampling the trigger signal in the two subsystems illustrated here. Consequently, although the respective local trigger signal 12 or 14 is synchronous with the respective local clock signal 11 or 13, since the local clock signals 11 and 13 of the subsystems do not have a constant (or at least a known) frequency or phase relation with respect to one another, the local trigger signals 12 and 14 in the worst case can have an offset 15 of up to approximately one clock cycle of the local clock signal 11 or 13, respectively. The measured values are thus recorded—despite the common trigger signal 10—by the measuring subsystems with a temporal uncertainty of up to one clock cycle. Depending on clock frequency and desired measuring precision, particularly in high precision measuring systems, this can lead to appreciable errors and should therefore be avoided. In addition to the uncertainty that all the sensors measure (15) at exactly the same instant, there are the latencies 15A and 15B in relation to the actual trigger signal 10. The latency times 15A and 15B likewise contribute to the offset between desired and actual measurement instant and are non-deterministic.

In order to elucidate the reduction of this error according to the invention, FIG. 2 illustrates the substantive matter illustrated in FIG. 1 comprising subsystems 17, 18 with the local clock signals 11, 13, which are synchronized according to the invention by means of a synchronization signal 19 and 30, respectively, between the measuring subsystems. In comparison with FIG. 1, as a result the temporal offset 37 (which corresponds to the offset 15 in FIG. 1) of the instant of the acquisition in the respective subsystems is significantly smaller or reduced to an extent such that it can be regarded as practically no longer present. It is now in the range of the phase inaccuracy (jitter) of the synchronization of the clock signals 11 and 13, which is significantly less than a clock period. The latency 38 between desired and actual measurement instant is still present on account of the asynchronicity of the external triggering signal, but can be measured for example with the aid of a higher clock in a subsystem (e.g. a superordinate control unit) or by means of an analog circuit and can be compensated for together with further latencies by mathematical interpolation or extrapolation since this is now determinable.

As an alternative to a transmission of the external trigger signal 10 that occurs, it is also possible to synchronize the asynchronous trigger signal 10 in a subunit, as trigger unit, likewise with the synchronized clock 21 or the synchronization signal 19 and subsequently to communicate the already synchronized trigger signal to the measuring subunits 17, 18. In this case, the latency time 38 can be determined only once in the trigger unit which provides this latency information to the measuring subsystems 17, 18 or to the control unit, which processes the measured values further, for the purpose of possible compensation.

In a simplest case, the synchronization signal 30 here is provided directly and it thus corresponds to the synchronization signal 19. In one simple embodiment, the synchronization signals 39 and 19 and the clock signals 21, 11 and 13 here would even be the same signal.

FIG. 2 illustrates an embodiment with a transmission of a synchronization signal having a lower frequency than that of the clock signal. With the use of a PLL, for example, the high-frequency clock signal 30 or 35 of the measuring system does not have to be transmitted directly, rather it is also possible to use a low-frequency synchronization signal 31 derived therefrom with a multiple of the cycle time of the clock signal for the purpose of synchronizing the PLL. FIG. 2 shows a double cycle time by way of example. In the case illustrated, (in particular for reasons of clarity) the local clock frequencies in the respective measuring subsystems are identical, but this need not necessarily be the case.

If use is made of a PLL or an equivalent circuit for the synchronization of the clock signal 11, 13 by the synchronization signal 30 in the subsystem, then the temporal offset in relation to the original clock signal 21 is only in the range of the phase jitter of the PLL or of the synchronization signal. That typically varies in the range of picoseconds in commercially conventional PLL components. In order to achieve the same simultaneity of the measured value acquisition with an embodiment according to the prior art, for comparison it would be necessary to sample the trigger signal with a frequency of several GHz to THz.

In a PLL there is optionally also the possibility of compensating for the ever present signal propagation times and signal delays caused by the cable connections and components by means of an adjustable phase offset of the PLL, whereby there is the possibility of increasing even further the temporal synchronicity of the subsystems 17, 18 with respect to one another.

As an alternative to a PLL, still further circuits for the synchronization of clock signals are appropriate, to test, for example, a modified Costas loop, or some other known structure suitable therefor.

Specifically, FIG. 2 shows with the combined clock-trigger signal 20 an example of an embodiment in which both the synchronization signal and the trigger signal are transmitted as a combined clock-trigger signal 20 via the same line. In this case, a synchronization signal 19 of lower frequency is derived from the clock signal 21. Said synchronization signal 19 is combined with the trigger signal 10, for example as shown here by means of a digital phase modulation of the synchronization signal 19 with the trigger signal 10 (e.g. with the aid of an XOR logic gate), and provided to the measuring subsystems 17, 18 as a combined clock-trigger signal 20. In a different manner of consideration, the trigger signal 10 is transmitted with the aid of an embodiment of a Manchester coding with the synchronization signal 19 as a combined signal 20.

In the subsystems 17, 18, the combined clock-trigger signal 20 is then divided again into a synchronization signal 30, which is used for the synchronization of the local clock signal 11 and 13, respectively, and a trigger signal 12 and 14, respectively. Since this takes place in the same way in each of the subsystems 17, 18, the clock signals 11, 13 and trigger signals 12, 14 of the measuring subsystems among one another are thus to a large extent simultaneous with respect to one another. Consequently, the instant of the measurement 37 in all the subsystems 17, 18 is also the same with a high temporal accuracy. The signals 20, 30, 11, 13, 12, 14 are represented only once since they are identical in the subsystems apart from a possible, very low, phase jitter 37.

Figure 3:
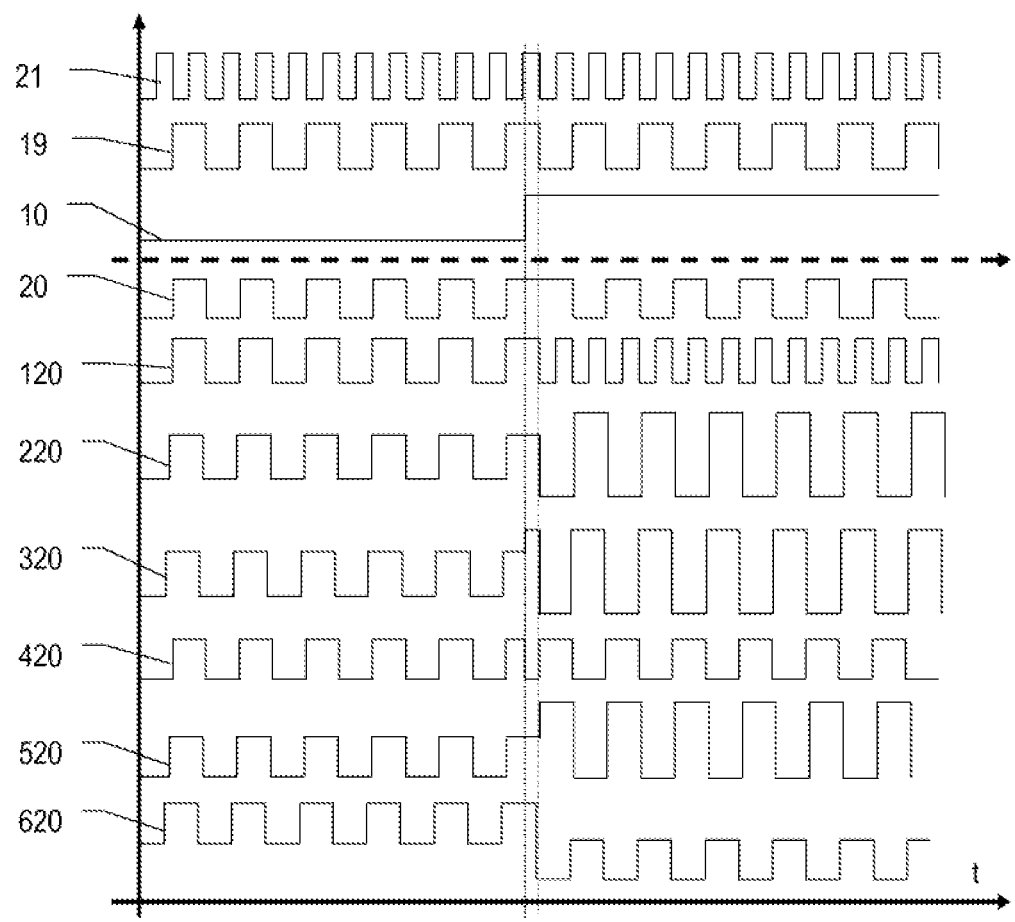
FIG. 3 shows some examples of embodiments according to the invention of a clock-trigger combination by means of an exemplary selection of different modulation methods.

FIG. 3 shows by way of example some embodiments in which the synchronization signal 19 and the trigger signal 10 are transmitted by means of a modulation method via one and the same line. As a result, the transmission according to the invention of the additional synchronization signal 19, compared with the prior art, becomes possible without requiring an additional signal line for this purpose.

In this case, it is possible to use a wide variety of modulation methods known for example from communications technology. By way of example, amplitude (ASK), phase (PSK), frequency (FSK), quadrature (QAM) or other modulation methods can be used for this purpose. Owing to the specific properties of the signals to be transmitted in this application, some of these methods can be implemented very easily, for example in the form of logic gates. However, significantly more complex modulator structures can also be used, for which quite a few integrated components that already contain the core elements for modulation and/or demodulation are commercially available.

Specifically, FIG. 3 shows the clock signal 21, the synchronization signal 19 and the trigger signal 10, which can be combined in accordance with the following methods explained by way of example with reference to some of them.

The signal 20 shows a digital PSK modulation, which can be realized in the case of digital signals, for example, in a simple form by means of a logic XOR combination. In this case, depending on the state of the trigger signal 10, the phase angle of the synchronization signal 19 is rotated by 180° and the resulting clock-trigger signal 20 is provided to the subsystems.

The signal 120 represents an embodiment with a digital FSK modulation, in which the frequency of the transmitted signal 120 is varied depending on the state of the trigger signal 10. The example shown involves changing between a frequency and half thereof depending on the state of the trigger signal 10.

The signal 220 shows an embodiment with a digital ASK modulation, in which the amplitude of the synchronization signal 19 is modulated depending on the trigger signal 10, symmetrically around the signal average value in the case illustrated.

The signal 320 shows an embodiment with a transmission of the asynchronous trigger signal 10 by means of an ASK modulation. A realization of this method would be possible, besides a multiplicity of other possibilities, for example in a simple manner by a pull-down resistor being connected to the synchronization line by the trigger initiator.

The signal 420 shows an embodiment with a PSK modulation, wherein the trigger signal 10 is not synchronized and transmitted in a trigger unit, but rather is communicated in asynchronous form to the subunits 17, 18 and the synchronization takes place in each case in the subunits 17, 18.

The signal 520 shows an embodiment with a combined PSK and ASK modulation, in which both phase and amplitude of the synchronization signal 19 are varied with the trigger signal 10.

The signal 620 shows an embodiment with a combined signal 620, which is effected by applying a trigger-signal-dependent DC offset to the synchronization signal 19.

The list in FIG. 3 is not an exhaustive enumeration, but rather is intended merely to give a few exemplary examples of applicable possibilities for realizing a joint transmission of a synchronization signal according to the invention jointly with a further signal and some examples of possible signal waveforms. A person skilled in the art is familiar with possible specific adaptations and concrete embodiments thereof, or these can be looked up in corresponding reference books, data sheets and application notes. It goes without saying that, besides the digital modulation and coding methods mentioned, analog methods can also be employed in an equivalent manner.

One suitable coding method of this type, which was developed in order to adapt data signals to specific requirements of transmission channels, may for example necessarily demand a level change after a certain number of clock cycles or transmitted bits. Such a change can also be used in the application described here in order to extract a synchronization signal 19 from a data or trigger signal 10 coded in this way, and a local clock signal 11, 13 can be synchronized with said synchronization signal. In addition, by way of example, edges of start, stop and/or an arbitrary communication bit of a digital communication can also be employed for synchronizing the clock signals 11, 13.

It is also possible to modulate a synchronization signal 19 on to a supply line (voltage or current supply), or to use a frequency of an AC voltage supply signal or an AC component of the supply voltage for synchronization purposes, in particular a phase angle of such an AC signal. For further details of such an embodiment of a transmission of the synchronization signal with a further signal as clock supply signal via a common line, reference should be made to corresponding reference books.

Further details and circuit examples regarding the transmission and modulation methods mentioned, if they are not familiar in any case, can be found in the relevant electrotechnical specialist literature such as, for example, in "digital communications" by John G. Proakis—Mcgraw-Hill Publ.Comp., for which reason a further, detailed description thereof is dispensed with.

FIG. 4 shows an exemplary application of the synchronization method in a geodetic instrument 40. In this case, two high precision angle sensors 41 and 42 are installed, these being symbolized by their axes of rotation and direction of rotation in the figure. The synchronization according to the invention of the angle sensors as measuring subunits allows a very highly simultaneous measurement of the angles on both axes. In addition, an optical distance measurement optionally present can also likewise be synchronized according to the same principle, whereby a spatial point can be measured in three coordinates exactly at a specific instant. The trigger signal can be generated here for example by the measuring electronics of the instrument 40 cyclically or on the basis of a predefined measurement program, and can also be triggerable manually by the operator.

FIG. 5 shows an exemplary application of a measuring system in the form of an articulated arm 50 with measuring subunits for position 52 and/or angle 51 measurement, said subunits being synchronized according to the invention. In this case, a probe head 55 fitted to the end of the arm triggers the trigger signal upon contact with a body. In response to said trigger signal, all the subsystems synchronized according to the invention store their current measured position value. These positions are then read out by a control unit 54 for example via a serial bus system. On the basis of these individual positions and the geometry information of the arm, that spatial position which corresponds to the point of contact of the probe head with the workpiece can be determined. Consequently, bodies having arbitrary geometries can be measured point by point with high precision.

Even if the position values are not temporally stable as a result of continual movements of the axes in the form of unsteady guidance, shaking and vibrations, as may be expected for example when the measuring arm is guided manually by an operator, an accurate spatial position can nevertheless be determined on account of the high precision simultaneity of the individual measurements. In this case, the instant of the measured value acquisition in all the measuring subunits is so exactly simultaneous that even the temporal position change caused by a possible movement during triggering does not lead to a position deviation in the measured values recorded by the measuring subsystems, since all the values were recorded at exactly the same instant and are thus intrinsically consistent. A temporal offset in the measured value acquisition of the individual axes, in the case of a moving measuring system without high precision synchronization, would lead to an inconsistent set of position values which would not correspond to the actual position at a trigger instant, but rather to the positions of the axes at—albeit only slightly—different instants, which would result in combination as a spatial coordinate in a 3D position which the measuring arm had actually never occupied at all.

In this case, the synchronization according to the invention of the subsystems reduces measuring errors on account of the movements of the measuring system during the measuring process.

Figure 6:
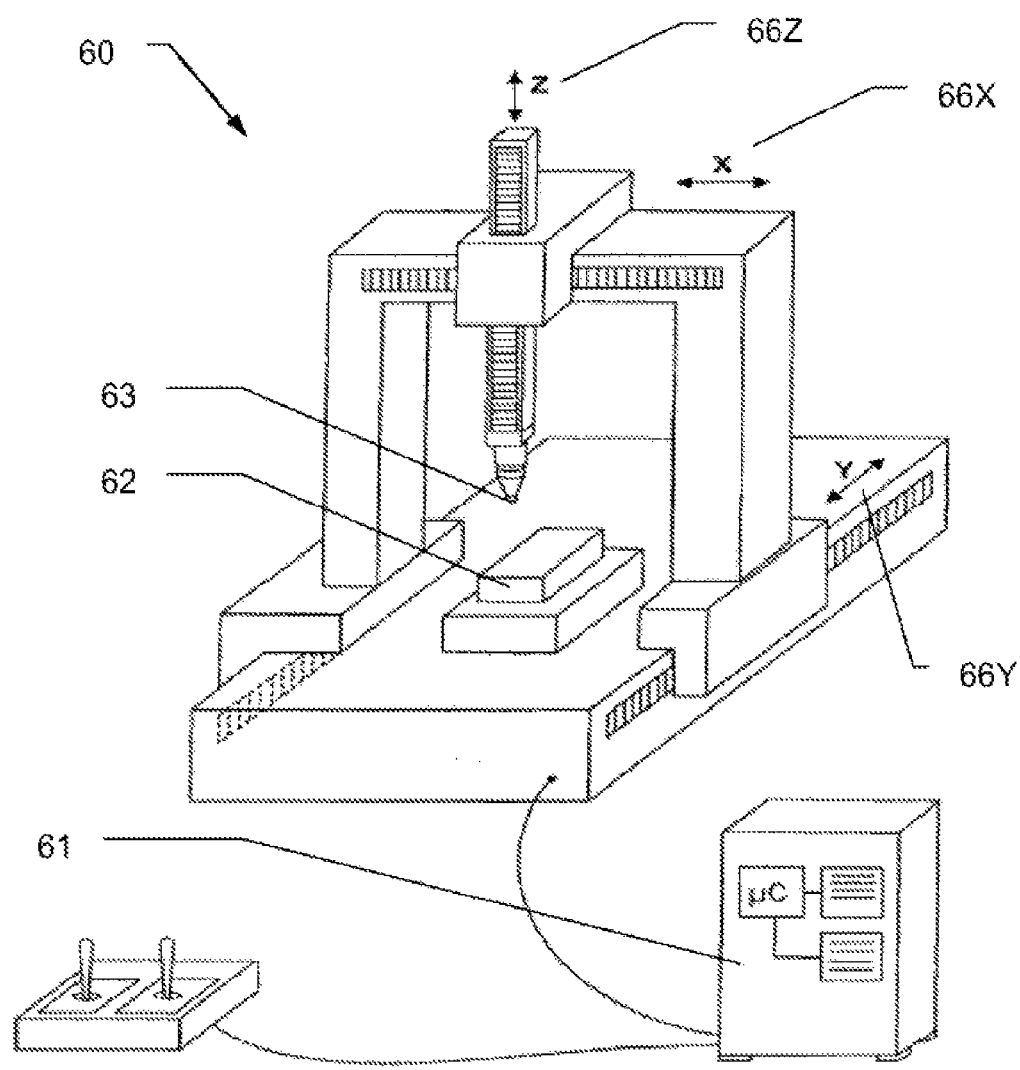
FIG. 6 shows by way of example a coordinate measuring machine of gantry design comprising subsystems according to the invention for position measurement.

FIG. 6 shows an exemplary application in the form of a coordinate measuring machine 60 of gantry design for measuring a workpiece 62 with position sensors 66X, 66Y and 66Z synchronized according to the invention. The principle of triggering the trigger signal by means of a tactile probe head 63, a light barrier or the excedance of a predetermined level of an analog signal corresponds to the principle described above for FIG. 5. On the basis of the trigger signal, triggered by the probe head 63, the position sensors 66X, 66Y and 66Z acquire the respective axial position as measured value, which is then read out by the control unit 61 and processed further to form spatial coordinates. Even in the case of analog "scanning probes", the probe deflection of which is read out not just digitally but as an analog deflection value, their deflection value can be concomitantly acquired synchronously according to the invention. In this case, however, the axes X, Y and Z are motor-driven and the trigger signal is triggered during the movement of the axes. If this triggering is not identified by all axes exactly at the same time or at least with the smallest possible temporal uncertainty, then, on account of the movement of the axes, rather than exactly the position at the trigger instant, in each axis a position deviating somewhat therefrom is acquired or the position at the trigger instant can be calculated only with corresponding uncertainty. This leads to errors in the spatial positions which are predominantly non-deterministic and therefore also cannot be compensated for numerically. Besides the axial positions, in this case the deflection of a measuring probe head of a measuring machine can also be acquired time-synchronously according to the principle according to the invention.

The illustration in FIG. 7a shows an exemplary block diagram of a measuring system known from the prior art, with reference to which some of the problems occurring in such systems will be explained again in detail. In this case, the subsystems 71a and 71b are measuring subunits for acquiring a measured value 76a and 76b, respectively, which is available as analog or digital information or is provided by the subsystem itself by the acquisition of one or more physical variables. The acquisition of this measured value is triggered by a trigger signal 70 of a subsystem 78, which can also be designated as trigger system. In the simplest case, the trigger instant is determined by an edge of an electrical signal, as is the case for example for a switching measurement probe. The trigger signal 70 can occur independently of any clocking, at an arbitrary instant.

In the subsystems 71a and 71b, the trigger signal is sampled in the block 72a/b with a respective clock signal 74*a/b* to form a trigger signal 77*a/b* synchronized with the respective clock signal 74*a/b*, with which trigger signal then in the latch unit 73*a/b*—likewise operating with the clock signal, or a clock signal 75*a/b* derived therefrom—the measured value at this instant is acquired and possibly buffer-stored (=latched).

Since, in systems according to the prior art, the clock signals of the clock units 74*a/b* are independent of one another and can deviate arbitrarily from one another in terms of frequency and phase, the instant of the respective local triggering is also subjected to a temporal shift which is non-deterministic and, in unfavorable cases, can attain a magnitude of up to one clock cycle.

Signals that occur in this case are illustrated by way of example in FIG. 7*b*. In this case, the trigger signal 70 can occur at an arbitrary instant. The clock signals 75*a* and 75*b* are generated in the respective subsystems without any reference to one another by respective local clock generators 74*a/b*. The trigger signal 70 is evaluated in each case upon the falling edge of the clock signal 75*a* and 75*b*, whereby the instant of the local triggering 77*a* and 77*b* is defined, at which instant the measured value 76*a* and 76*b* is respectively acquired by the latch unit 73*a* and 73*b*. This gives rise to a temporal offset 15, which is also illustrated here by dashed lines. The temporal jitter 15 thus present, which is present despite the common trigger signal, can have a bandwidth of up to a cycle duration of the clock signal and, on account of the frequency drift of the clock signals relative to one another, is also not constant over time.

The illustration in FIG. 8*a* shows the same system as previously, but now according to the invention the two local clock generators 74*a* and 74*b* are synchronized with one another. This can be done for example according to one of the methods described in detail above.

The signals in FIG. 8*b* clearly show that now no time offset (or a time offset that is orders of magnitude smaller) of the local trigger instants 92*a* and 92*b* occurs since all subsystems sample the trigger signal with the synchronous clock signals 85*a* and 85*b*, respectively, and the measured values 86*a* and 86*b* are thus acquired in each subsystem 81*a* and 81*b* with a high degree of simultaneity. The remaining latency 38 can furthermore be compensated for together with further latencies in the system with the aid of interpolation or extrapolation. The latency is determinable and can be measured, for example with the aid of a higher clock in at least one of the subsystems, such as, for instance, a likewise clock-synchronized control unit for measurement evaluation and further processing. In particular, the control unit can function as a "master" of the synchronization. The frequencies and the phase angles of the local clocks 84*a/b* are known to the control unit in any case.

The respectively simultaneous signals 84*a*, 84*b* and 92*a*, 92*b* are illustrated only once in the diagrams on account of their synchronicity according to the invention, but designated by a plurality of reference signs.

The temporal synchronization of the clock signals 85*a/b* of the clock generators 84*a/b* with the synchronization signal 87*a/b* can be effected in this case on the basis of one of the methods described above.

A further embodiment is illustrated in FIG. 9*a*, which likewise has synchronized clock signals 84*a* and 84*b*, with which now furthermore the clock generator 89 of the subsystem 93, designated as trigger system, is also synchronized. In this embodiment, the signals of which are illustrated in FIG. 9*b*, the asynchronous trigger signal 91 of the trigger initiator 88 in the unit 90 designated as clock-trigger modulator is temporally quantized with the clock signal 89 to form a synchronous trigger signal. The clock-trigger modulator 90 then provides both the synchronous trigger signal and the synchronization signal as combined clock-trigger signal 80 to the other subsystems 81*a/b*.

In the subsystems 81*a/b*, the clock-trigger signal 80 is divided into a local synchronization signal 87*a/b* and a local trigger signal 92*a/b* in the function block 82*a/b*, designated as clock-trigger demodulator. The local synchronization signal 87*a/b* is then used for synchronizing the local clock unit 84*a/b* or the local clock signal 85*a/b* generated by this. It is thus ensured that the clock units 89, 84*a* and 84*b* are in each case simultaneous apart from the possible presence of a very small phase jitter with respect to one another.

The local trigger signal 92*a/b*, which is already synchronous with the clock signals 84*a*, 84*b* and 89, thus has only a very small temporal jitter relative to the other measuring subsystems upon the triggering of the measured value acquisition in the respective latch units 83*a/b*.

In a further-reaching embodiment, a wide variety of forms of a subsampling interpolation are also possible, in which, on the basis of a high resolution temporal quantization of the trigger signal with a clock rate which is higher than the local clock signals of the acquisition, it is possible to determine a high resolution instant of the triggering between the acquisition of two measured values. Consequently, an interpolated measured value which lies between the actually acquired measured values at the high resolution instant can be determined on the basis of an interpolation method.

FIG. 10*a* shows such an interpolation. In this case, besides the clock and trigger signal, the trigger unit 93 provides an even higher resolution subsample time information item with the time generator 95, on the basis of which an interpolation of the measured values can be carried out. In this case, the unit 94, designated as subsample timer, determines the time difference between the asynchronous trigger signal 91 and the synchronized trigger information of the clock-trigger signal 80 in high resolution time units. This can be done for example digitally with the aid of a high-frequency counter or else in an analog manner e.g. by means of a voltage ramp. In this case, only this subsample timer has to operate as a high-frequency counter, and the rest of the circuit can operate with the slower clock signal synchronized according to the invention across a plurality of measuring subunits.

Consequently, the evolution of heat and the energy consumption in the measuring subunits can be kept low and a high measuring precision can nevertheless be achieved. The subsample time information thus determined can then be used for an interpolation or extrapolation of the recorded measured values, as will be described below.

FIG. 10*b* shows timing diagrams of such an interpolation. In this case, the time duration between the trigger signal 91 and the trigger signal synchronized with the edge of the clock signal 89 is represented as the width of the pulse 94. This width is determined by a faster clock signal of the high-frequency clock generator 95, in this case for example upon four edges of the clock generator 95, which has a higher clock rate than the synchronized, local signal. The synchronized trigger signal is provided to the subsystems in this example as clock-trigger signal 80 with a phase modulation.

The real measurement signal 86*a* is sampled with the rising edge of the synchronized clock signal 89 to form measured values, as is illustrated by the black points. The measured values are interpolated linearly for example, as illustrated by the dotted line. As a result, and together with the subsample time information of 94, the actually recorded measured value 102 can be improved to a value 101 of the linear interpolation, which is brought distinctly closer to the actual value 100 of the signal. Particularly if the bandwidth of the measurement signal is less than half the sampling rate, the measured value can be determined very exactly at the trigger instant with the aid of the interpolation. If known, an interpolation according to a function which represents the physical model of the measured value and/or the time derivatives thereof can lead to a further increase in precision. For the purpose of interpolation or extrapolation, besides a simple linear function, it is also possible to use a higher-order function oriented to the physical model of the measured system or else a corresponding differential function.

As an alternative to the provision of the subsample time information by the trigger unit 93, the interpolated measured value can also be determined directly in the measuring unit 81 and be provided by the latter, as illustrated in FIG. 10c. In this case, the synchronized clock generator 84 (or a clock generator provided specially therefor) generates a subsample clock 89 having a higher frequency than the that of the synchronized clock signal, with the aid of which the subsampling unit 94 is determined the temporal difference between the clock edge—acquiring the measured value—of the clock signal 85 and the asynchronous trigger signal 92. A data processing unit (not illustrated here) can perform a signal interpolation therefrom, as has been described by way of example above on the basis of a linear interpolation. In this case, the trigger signal is provided asynchronously with respect to the synchronization signal for the local clock signals.

The corresponding time profiles of the signals are illustrated in FIG. 10d.

It goes without saying that the above explanations can also be extended to an arbitrary number of subsystems.

Moreover, in this case, different tasks, such as triggering, measured value acquisition, interpolation, measured value evaluation, control by an electronic controller system, and also combinations thereof, can be assigned to the subsystems.

What is claimed is:

1. A method for a line-based high precision temporal synchronization of measured value acquisitions in a spatial coordinate measuring machine comprising a plurality of spatially distributed measuring subunits, the method comprising:
   signaling an instant for triggering the measured value acquisition using a trigger signal;
   respectively acquiring and buffer-storing a measured value in the measuring subunit at the instant determined by the trigger signal, wherein the measured value is acquired in the measuring subunits in each case in a time-quantified manner with a local clock signal of the measuring subunit;
   phase synchronizing of the local clock signals of the measuring subunits using a synchronization signal for ensuring simultaneity of acquiring the measured value in the measuring subunits with a temporal uncertainty less than 90% of a period duration of the local clock signal; and
   providing the synchronization signal and a further signal as common signal via a common signal line.

2. The method as claimed in claim 1, wherein the temporal uncertainty is less than half a period duration of the local clock signal.

3. The method as claimed in claim 1, wherein the temporal uncertainty is in less than one fifth of the period duration.

4. The method as claimed in claim 1, wherein:
   the signaling is performed using a measuring probe; and
   the acquiring is performed using position value sensors.

5. The method as claimed in claim 1, wherein:
   providing the synchronization signal and the further signal as common signal is performed using a modulation method in such a way that the corresponding components can be reconstructed from the common signal, wherein the modulation method is performed in the form of an FSK, PSK, ASK or QAM.

6. The method as claimed in claim 5, wherein:
   the modulation method is performed as a digital modulation method, in the form of a logical combination of the synchronization signal and the further signal.

7. The method as claimed in claim 5, wherein:
   providing the synchronization signal and the further signal as common signal is performed using a line coding by which the local clock signals can be synchronized, wherein the line coding is in the form of a Manchester code.

8. The method as claimed in claim 5, wherein:
   the synchronization signal and the trigger signal as the further signal are provided using a combined clock-trigger signal, wherein the combined clock-trigger signal is transmitted via the common signal line.

9. The method as claimed in claim 5, further comprising providing the synchronization signal via a supply signal as the further signal by means of a supply-voltage-carrying line as combined clock-supply signal.

10. The method as claimed in claim 5, further comprising providing the synchronization signal and a data signal as the further signal via a common signal line as a combined clock-data signal.

11. The method as claimed in claim 5, further comprising providing the trigger signal to the measuring subunits as a synchronous trigger signal, wherein the trigger signal is time-quantized with the synchronized clock signal in a subunit as trigger unit and is provided to the measuring subunits as the synchronized trigger signal.

12. The method as claimed claim 5, further comprising providing the trigger signal to the measuring subunits as an asynchronous trigger signal, which is time-quantized with the synchronized local clock signal in each case in the measuring subunits.

13. The method as claimed in claim 1, wherein:
   the synchronization of the respective local clock signal is performed using a feedback control loop from the synchronization signal, wherein the synchronization signal has a multiple of the cycle time of the local clock signal generated therefrom.

14. The method as claimed in claim 1, wherein:
   the local clock signal has a constant, freely selectable phase offset relative to the synchronization signal as latency time compensation for compensating for a signal propagation time on account of line lengths and circuitry delays on the basis of the signal propagation times and delays between the measuring subsystems that can be determined automatically by the measuring system.

15. The method as claimed in claim 14, wherein:
   the freely selectable phase offset is configured by the measuring system automatically.

16. The method as claimed in claim 1, wherein:
   the subunits with their synchronized local clock signals acquire the measured values and store a temporally limited history of the measured values;
   signaling the instant of triggering is performed by distributing the trigger signal, which defines the trigger instant and is asynchronous with respect to the synchronized clock signals; and
   the measured values are determined by computational interpolation or extrapolation of the synchronously acquired measured values to the asynchronous trigger instant, wherein:

wherein at least one of the subunits for the interpolation or extrapolation carries out a time determination with a temporal resolution below a period duration of the local clock signal.

17. A triggerable coordinate measuring system comprising a plurality of measuring subunits comprising:
- a measured value input for acquiring a physical variable as measured value;
- a line-based trigger signal input for triggering the measured value acquisition at an instant determined by a trigger signal;
- a local clock signal for the time-quantified, measuring-subsystem-internal signal processing of the measured value acquisition, wherein:
  - a synchronization unit for the phase synchronization of the local clock signals in the measuring subunits of the measuring system on the basis of a synchronization signal; and
  - the synchronization signal is transmitted together with a further signal via a common signal line.

18. The triggerable coordinate measuring system as claimed in claim 17, wherein:
- the synchronization signal is transmitted together with the trigger signal as combined clock-trigger signal in the measuring system.

* * * * *